May 22, 1945.  J. E. LYLE  2,376,547

AGRICULTURAL MACHINE

Filed Oct. 26, 1942

Inventor:
James E. Lyle
By: Paul O. Pippel
Atty.

Patented May 22, 1945

2,376,547

UNITED STATES PATENT OFFICE 2,376,547

AGRICULTURAL MACHINE

James E. Lyle, Canton, Ill., assignor to International Harvester Company, a corporation of New Jersey Application October 26, 1942, Serial No. 463,381

4 Claims. (Cl. 56—400)

This invention relates to an agricultural machine and more particularly to a machine of the type known as a stalk cutter. Still more particularly the invention relates to means for straightening or otherwise preparing crops, such as stalks, to be treated by a cutter or chopper as the machine advances over the field.

A machine of one particular type of the class referred to above generally comprises a frame carrying a stalk cutter for rotation about an axis transverse to the line of advance of the machine. The machine is operated over a field on which stalks or similar crops are strewn about, and these crops are engaged and reduced by the cutter. It has heretofore been common practice to provide means ahead of the cutter for straightening or otherwise arranging the stalks in positions to be cut more readily by the cutter. In such prior constructions a disadvantage lay in the arrangement of the straightening device, inasmuch as this device was subject to damage when the machine was backed or reversed.

Accordingly, an important object of the present invention is to provide an improved mounting for the stalk straightener of a machine of the type referred to above, it being also an object to adapt the principles of the invention to other machines having devices adapted for preparing crops or the ground for treatment by devices following the first devices as the machine advances.

An important object is to provide means in the form of a toggle for mounting a stalk-straightening member, or its equivalent, for yielding movement when the member encounters an obstruction during either forward or rearward travel of the machine.

Figure 1:
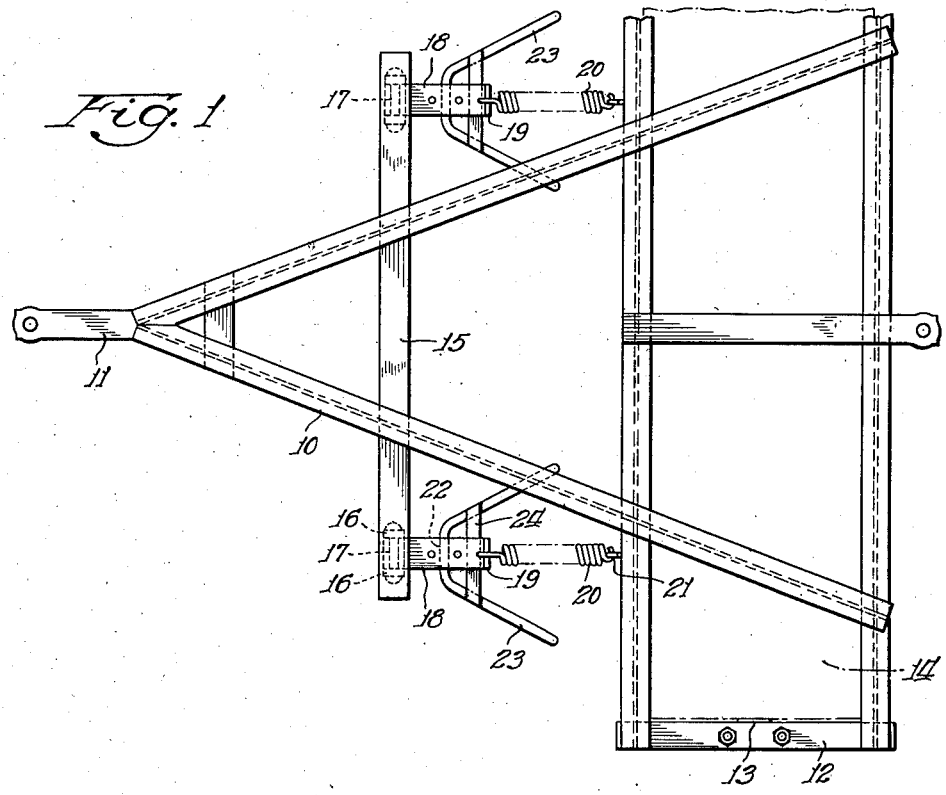
Figure 2:
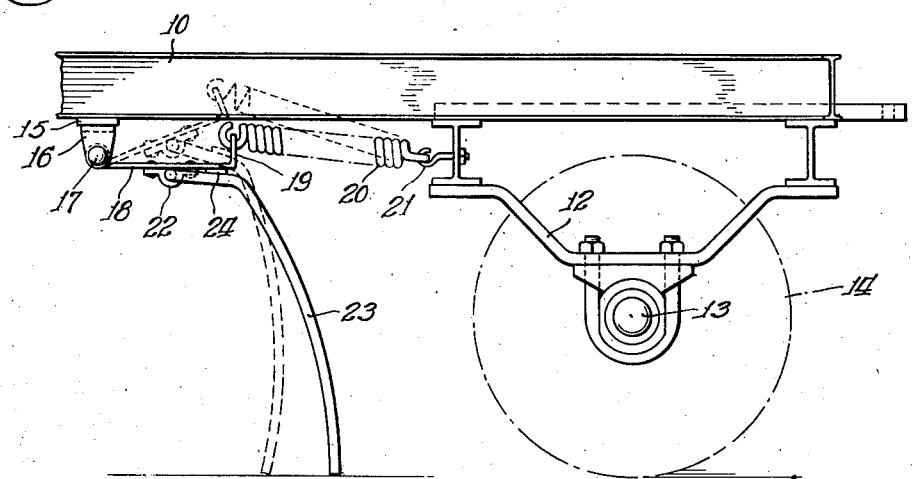

Other important objects and features of the invention will become apparent as the disclosure is more fully made in the following detailed description and accompanying sheet of drawings, in which:

Figure 1 is a plan view of a stalk-cutting machine embodying one form of the invention; and Figure 2 is a side elevational view of the same on an enlarged scale.

The particular form of machine illustrated comprises a main frame 10 provided with a draft-bar 11 at its forward end and with a sub-frame or supporting structure 12 at its rear end. The sub-frame carries in transversely spaced bearings a transverse shaft 13, on which is mounted a stalk cutter of any conventional type, as indicated in broken lines at 14. It will be understood that the structure just described is only representative of any number of types that the machine may take, and accordingly, the description is specific only to the extent that it suffices to form a background for a disclosure of the invention.

The draft-bar 11 of the machine may be connected to any suitable source of draft power, and the machine is thus moved forwardly over the field, the cutting element 14 engaging stalks or other crops lying on the field.

A forward portion of the frame 10 rigidly carries a transverse supporting bar 15 having at each of its opposite ends a depending bracket 16 provided with a pivot pin 17 arranged on axis transverse to the line of draft. There may be several of these brackets 16 for the supporting of several stalk-straightening devices. However, these devices may all be similar, and accordingly, the following description of one such device pertains likewise to similar devices. As best shown in Figure 2, the pivot pin 17 carries a horizontally rearwardly extending support 18 having an upturned rearward end 19 connected to one end of a tension spring 20. The other end of the spring is connected at 21 to a portion of the sub-frame structure 12. The spring 20 is so connected and arranged as to maintain the position of the support 18 substantially as shown in Figure 2.

The support 18 is provided with a bearing 22 providing a pivot on an axis parallel to the axis of the pivot pin 17. This bearing carries an upper bight portion of a stalk-straightening member 23, the lower ends or legs of the member being disposed adjacent the ground to engage stalks ahead of the cutting element 14. The upper portions of the legs of the member 23 are rigidly cross-connected by a short bar 24, opposite ends of the bar being rigidly secured, as by welding, to the legs of the member. The bar 24 engages the under surface of the support 18 at a portion of the support spaced rearwardly of the bearing 22. It will thus be seen that the support 18 may have relative movement about a transverse axis with respect to the frame 10, and that the member 23 may have movement about a transverse axis with respect to the support 18. As best shown in the broken lines in Figure 2, the movement of the parts against the tension of the spring 20 is generally upwardly.

As the machine advances over the field, the members 23 will engage stalks and position these stalks so that they may be engaged by the cutting element 14, which, as is well understood to those skilled in the art, is usually provided with a plurality of transverse blades. In the event that the members 23 encounter an obstruction in the form of a excess accumulation of stalks or otherwise, the members, together with the supports 18, may swing rearwardly about the pivot pins 17 against the tension of the springs 20. The springs 20 serve normally to maintain the parts in the positions shown in full lines in Figure 2.

In constructions of the type heretofore known, backing of the machine usually resulted in bending of or other damage to the straightening members, since these members were mounted on a simple pivot on the frame. Accordingly, when such machines were backed, the straightening members would dig into the ground, and the force applied thereto was such as to prevent proper yielding of the members. The present invention overcomes this disadvantage by the provision of the double pivot 17 and 22, which is in the nature of a toggle, permitting relative movement between the member 23 and the support 18, as indicated in broken lines in Figure 2. It will thus be seen that the member 23 may yield substantially directly rearwardly upon the encountering of an obstruction during forward movement of the machine, and that in addition the member may move forwardly and upwardly with respect to the frame as the machine is backed. In both instances the mounting of the member 23 prevents damage to the member.

As previously stated, the foregoing description and illustration pertain to only a preferred embodiment and use of the invention. It will be understood that numerous modifications and alterations may be made in the preferred structure shown and described without departure from the spirit and scope of the invention as defined in the appended claims.

What is claimed is:

1. Means for mounting a rake tooth upon a traveling support comprising a longitudinally extending member pivoted at its forward end upon the support for generally vertical pivotal movement about an axis transverse to the line of advance of the support, a downwardly extending ground-engaging rake element mounted upon said member for forward and rearward pivotal movement about a transverse axis rearwardly spaced from the axis of the member on the support, said element being adapted to engage the ground with increased pressure upon forward pivoting thereof when the traveling support is backed and to exert thrust upwardly against said member, and means resiliently holding said member against vertical pivotal movement.

2. Means for mounting a rake tooth or the like upon a traveling support comprising a longitudinally extending member pivoted at its forward end upon the support for generally vertical pivotal movement about an axis transverse to the line of advance of the support, a longitudinally extending spring connecting said support and the free end of said member to resiliently hold the latter against vertical pivotal movement, a rake element mounted on the member for forward and rearward pivotal movement about a transverse axis rearwardly spaced from the axis of the member on the support comprising a pair of laterally spaced downwardly extending legs connected near their upper ends by a tranverse bar adapted to engage said member at a location rearwardly of the pivot of said rake element on said member when the element is in operating position.

3. Means for mounting a rake tooth or the like upon a traveling support adapted to advance over a field and engage vegetation such as stalks and the like, comprising a horizontally rearwardly extending member mounted at its forwardly end upon the support for pivotal movement upwardly about an axis transverse to the line of advance of said traveling support, a downwardly extending ground-engaging rake element mounted at its upper end upon said member for pivotal movement forwardly and rearwardly with respect thereto about a transverse axis rearwardly removed from the axis of the member on the support, means forming a part of said rake element and engageable with said member at a location rearwardly of the pivot of said rake element on said member to hold the element in ground engaging position, said element being adapted to engage the ground with increased pressure upon forward pivoting thereof when said traveling support is backed and to exert upward thrust against said member, and resilient means connecting the member to the support for yieldingly resisting upward movement thereof.

4. Means for mounting a rake tooth or the like upon a traveling support adapted to advance over a field and engage vegetation such as stalks and the like, comprising a horizontally rearwardly extending member mounted at its forward end upon the support for pivotal movement upwardly about an axis transverse to the line of advance of said traveling support, a ground-engaging element having laterally spaced downwardly extending legs and mounted at its upper end upon said member for pivotal movement forwardly and rearwardly with respect thereto about a transverse axis rearwardly removed from the axis of the member on the support, a bar rigidly connecting said legs near their upper ends and engageable with said member at a location rearwardly of the pivot of said rake element on said member to hold the element in ground-engaging position, said element being adapted to engage the ground with increased pressure upon forward pivoting thereof when said traveling support is backed and to exert upward thrust against said member, and resilient means connecting the member to the support for yieldingly resisting upward movement thereof.

JAMES E. LYLE.